United States Patent [19]

Loforese

[11] Patent Number: 4,481,435
[45] Date of Patent: Nov. 6, 1984

[54] FIELD COIL TERMINAL CONNECTOR FOR STATOR ASSEMBLIES

[75] Inventor: Leonard T. Loforese, Greenwich, Conn.

[73] Assignee: Electrolux Corporation, Stamford, Conn.

[21] Appl. No.: 428,892

[22] Filed: Sep. 30, 1982

Related U.S. Application Data

[63] Continuation-in-part of Ser. No. 229,915, Jan. 30, 1981, abandoned.

[51] Int. Cl.³ .......................................... H02K 11/00
[52] U.S. Cl. ..................................... 310/71; 310/194; 310/260
[58] Field of Search .................. 310/71, 217, 216, 194, 310/43, 45, 254, 260, 259; 336/192; 339/119 R; 29/596

[56] References Cited

U.S. PATENT DOCUMENTS

| | | | |
|---|---|---|---|
| 2,872,599 | 2/1959 | De Young | 310/71 |
| 3,027,475 | 3/1962 | Gaudry | 310/260 |
| 3,457,442 | 7/1969 | Charlton et al. | 310/71 |
| 3,518,616 | 6/1970 | Lewis | 310/71 UX |
| 3,519,860 | 7/1970 | Stone | 310/71 |
| 3,664,017 | 5/1972 | Stone | 310/71 |
| 3,725,707 | 4/1973 | Leimbach et al. | 310/71 |
| 3,760,339 | 9/1973 | Marshall | 310/71 |
| 3,780,323 | 12/1973 | Swain | 310/71 |
| 3,861,026 | 1/1975 | Swaim | 310/43 |
| 3,867,658 | 2/1975 | Dochterman | 310/71 |
| 3,963,949 | 6/1976 | Church | 310/43 |
| 3,979,615 | 9/1976 | Neff | 310/71 |
| 3,984,714 | 10/1976 | Grozinger et al. | 310/194 |
| 3,984,908 | 10/1976 | Ackley | 310/71 |
| 4,004,169 | 1/1977 | Charlton | 310/71 |
| 4,038,573 | 7/1977 | Hillyer | 310/71 |
| 4,071,793 | 1/1978 | Cox | 310/71 |
| 4,074,418 | 2/1978 | Pearshall | 29/596 |
| 4,132,460 | 1/1979 | Porta | 310/71 |
| 4,147,398 | 4/1979 | Lill | 310/71 |
| 4,177,397 | 12/1979 | Lill | 310/71 |
| 4,181,393 | 1/1980 | Lill | 310/71 |
| 4,287,446 | 9/1981 | Lill | 310/71 |
| 4,361,733 | 11/1982 | Mokrzycki | 310/71 |

FOREIGN PATENT DOCUMENTS

| | | |
|---|---|---|
| 913351 | 12/1962 | United Kingdom . |
| 1763353 | 8/1971 | Fed. Rep. of Germany ........ 310/71 |
| 1402592 | 8/1975 | United Kingdom . |
| 1482470 | 8/1977 | United Kingdom . |
| 2064230 | 6/1981 | United Kingdom . |

*Primary Examiner*—R. Skudy
*Attorney, Agent, or Firm*—Jeffrey H. Ingerman

[57] ABSTRACT

An insulated terminal connector which is designed to be frictionally mounted on the upper surface of a stator core prior to winding the field coils about the poles disposed inwardly of the core includes a retainer device and an alignment device.

6 Claims, 8 Drawing Figures

FIELD COIL TERMINAL CONNECTOR FOR STATOR ASSEMBLIES

RELATED APPLICATIONS

The present application is a continuation-in-part of application Ser. No. 229,915, filed Jan. 30, 1981, now abandoned, for a "Field Coil Terminal Connector for Stator Assemblies", assigned in common herewith.

BACKGROUND OF THE INVENTION

This application relates generally to dynamoelectric machines or electric motors and particularly to an insulated field coil terminal connector for both separately-wound and in-position-wound stator assemblies, the terminal connector being mounted and retained in position on the stator core without additional mechanical fasteners and without interfering with assembly and disassembly of the component parts of an electrical motor comprising the stator assembly.

Heretofore there has been a great deal of development with regard to providing insulated terminals for use in connecting outside terminal sources (such as commutator brush leads) to the ends of the field coil windings of a stator assembly. Many conventional connectors comprise insulated strips which are attached to the laminations of the stator core and which include connector wells which cooperatively receive the ends of the field coil windings and the terminals' outside electrical leads.

Conventionally, such terminal connectors often either are mechanically connected to the stack of laminations forming the stator core or are maintained in position by the field coil winding, in the latter case either having been placed and maintained in position during the initial winding operation or having been forced into frictional engagement with the winding subsequent to the coil formation. In order to mechanically secure coil winding terminal connectors to the stator assembly, such connectors have been disposed between the pole members of the stator and secured by pins or other connecting means (which may also serve to mount other motor components to the core) passed into aligned apertures formed in the laminated plates of the stator core.

It has been determined that when a terminal connector is mechanically connected or assembled with other motor components which are also attached to the laminations of the stator core, the terminals may shift from or otherwise become misaligned relative to their proper mounting position during assembly and disassembly of such other motor parts.

Some examples of the prior art are U.S. Pat. Nos. 2,872,599; 3,027,475; 3,519,860; 3,979,615; 4,038,573; 4,071,793; 4,132,460; 3,760,339; 3,780,323; and 3,984,908.

SUMMARY OF THE INVENTION

This invention is directed to a coil winding terminal connector for generally annular stator assemblies. In the preferred embodiments, the terminal connector of the invention includes a pair of upwardly extending terminal wells integral with a generally arcuate insulated terminal strip, adapted to be mounted on a stator assembly immediately adjacent and radially outward from a stator pole. According to the invention, the terminal connector includes retention means for frictionally engaging the laminated core stack and means to keep the terminal connector properly aligned in position on the stack. In one preferred embodiment, the retention means comprises depending tab portions configured and oriented with respect to one another so as to engage both the inner surface of the laminate stack and the outer surface of the stack and serve as the alignment means as well. In another preferred embodiment, the retainer device comprises two downwardly extending posts resiliently received in a slot in the core. Depending tabs, preferably on the outer circumferential rim of the connector, serve as the alignment means. Both embodiments are held in place without requiring supplemental mechanical fasteners and without being otherwise connected to the stator core by other component parts of the motor.

In another aspect, the present invention is a stator coil winding terminal connector comprising terminal wells disposed on one face of a generally arcuate insulated terminal trip that is provided on its opposite face with two spaced-apart posts adapted to be frictionally received in a slot provided for them in the laminates forming the stator core, behind (i.e., radially outward from) a pole piece of the stator. Preferably, a through-slot having its end-points at the two posts is provided in the terminal strip. Arcuate tabs or lugs extending in the same direction as the posts lie against either inner or outer curved surfaces of the core, preferably outer. The posts are preferably semi-circular in cross-section to retain the terminal connector securely on the core. The tabs or lugs prevent misalignment of the terminal connector relative to the core, and particularly prevent the connection from tipping toward the center of the core due to handling of the core by automatic assembly machinery.

It is a primary object of this invention to provide an insulated terminal strip for electric motors whereby the ends of the field coil may be cooperatively connected to the leads of an outside electrical circuit, which terminal is precisely maintained in mounted position during assembly and disassembly of the motor.

It is another object of this invention to provide a terminal connector for either separately-wound or in-position wound stator assemblies wherein the terminal connector is frictionally mounted to the core rearwardly of a stator pole so as to be on the upper laminates of the stator core assembly and includes first depending lug or tab portions disposed inwardly of the stator stack and generally within the winding grooves of the stator pole so as to be therein engaged by the field coil as it is wound about such pole.

It is another object of this invention to provide a terminal connector for dynamoelectric machines wherein the connector is not shiftable with respect to the core of the stator during assembly or disassembly of the machine, as such connector is not interconnected with other assembly locking means or brackets, but is frictionally and bindingly engaged to the core.

DETAILED DESCRIPTION OF THE PREFERRED EMBODIMENTS

Figure 1:
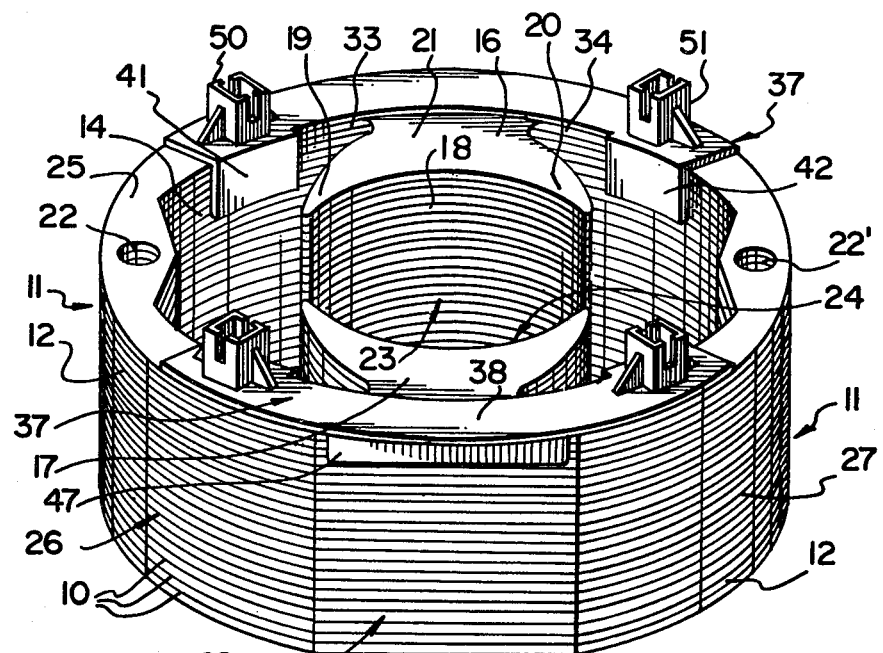
FIG. 1 is a perspective view of a stator assembly showing one preferred embodiment of the terminal connectors of the present invention.
Figure 2:
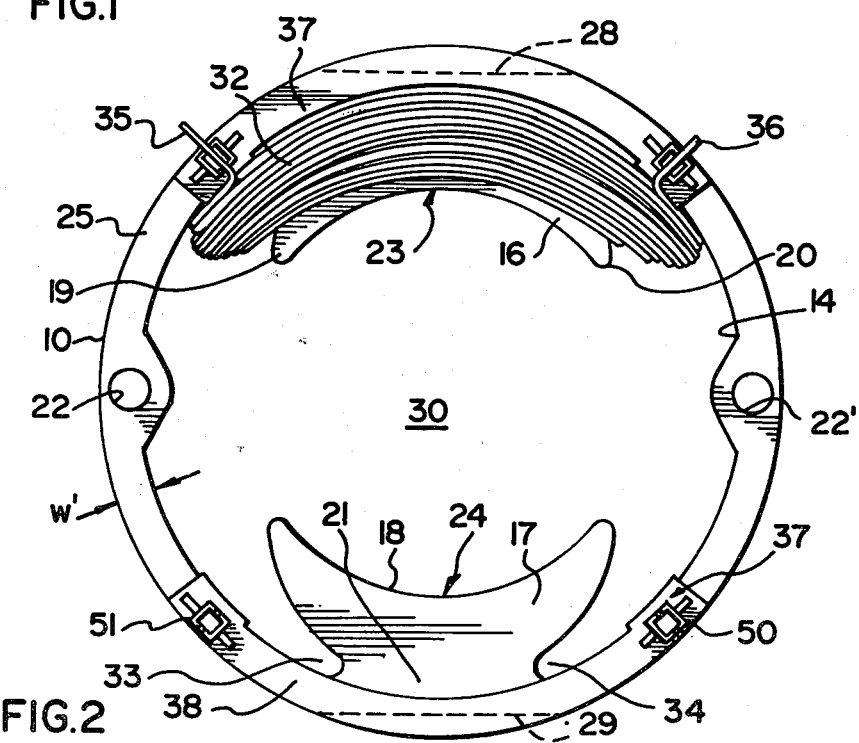
FIG. 2 is a top plan view of the stator assembly of FIG. 1.

FIGS. 1 and 2 show a plurality of approximately annular ferrous laminations 10 assembled in a stack forming the iron core 11 of an electric motor stator. The outside configuration of each lamination 10 is defined by oppositely disposed annular wall portions 12 and interconnecting flat walls. The inner walls 14 of each annular lamination 10 are generally annular but include a pair of oppositely disposed, facing pole elements 16 and 17. Each pole element is generally Y-shaped and includes a concavely formed face portion 18 defined by outwardly extending flanges 19 and 20, which are connected to the remainder of the annular lamination 10 by a reduced neck portion 21. A pair of oppositely disposed bracket mounting holes 22 and 22' are also provided in each laminate, located midway between the pole elements 16 and 17.

When the annular ferrous laminations 10 are stacked and welded or otherwise secured together, they form a stator core 11 substantially as shown in FIG. 1. The stator core 11 has a generally annular upper surface or end face 25, defined generally by the arcuate inner and outer wall portions 12 and 14, and by the two inwardly disposed poles 23 and 24. The outer wall portion 14 includes a pair of arcuate exterior walls 26 and 27 which define the outer diameter of the core 11 and which are connected by two planar wall portions 28 and 29. When the laminations 10 are assembled, the arcuate or concavely shaped face portions 18 of the pole elements 16 and 17 define between them an elongated opening or bore 30 in which the armature (not shown) is received when the motor is assembled.

Each pole element 16 and 17 is provided or formed along an inner portion of the lamination 10 directly opposite the flat exterior wall portion 28 or 29. Therefore, in the assembled stack, each of the stator poles 23 or 24 is disposed opposite an exterior planar wall portion 28 or 29 of the stator core 11.

FIG. 2 shows a field coil winding 32 wound within winding grooves 33 and 34, which are defined by the neck portion 21, the inner walls 14 and the outwardly extending flanges 19 and 20 of each pole. The field coil winding 32 includes terminal ends 35 and 36, which are cooperatively received by the insulated electrical terminal connector 37 of the present invention in a manner hereinafter to be described in detail.

In FIG. 1, the insulated terminal connector 37 of the present invention is shown as it is frictionally mounted on the upper laminate surface 25 of the stator core 11. The terminal connector 37 is specially designed and adapted to be mounted radially outward from one of the stator poles 23 or 24 so as to be substantially between the pole and the adjacent planar outer surface or wall portion 13 of the core.

Each of the terminal connectors 37 includes an arcuately shaped elongated body portion 38 of a width W, having inner and outer arcuate walls 39 and 40, respectively. Each wall 39 and 40 is an arc of a circle of such radius as to insure that the width W of the elongated body portion 38 is substantially equal to the width W' of each of the annular laminations 10, as defined between the inner and outer annular wall portions thereof, so that the walls of the body portion 38 will be substantially co-extensive with the arcuate portions of the underlying laminations 10 when mounted in position behind the stator poles.

Figure 3:
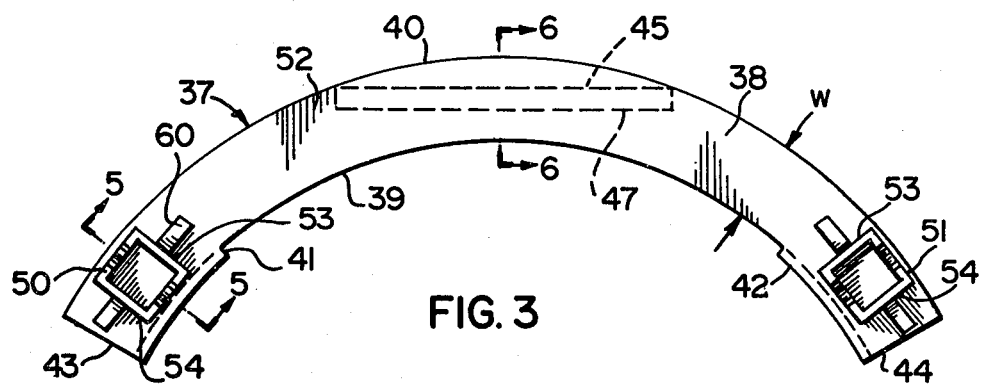
FIG. 3 is a top plan view of the terminal connector shown in FIG. 1.

A pair of depending leg portions or inner lug members 41 and 42 are provided adjacent each end 43 and 44, respectively, of the arcuate body portion 38. As shown, each lug member 41, 42 is generally rectangular and is oriented substantially perpendicular to the arcuate body portion 38. As shown in FIG. 3, each inner lug member 41, 42 is substantially arcuate so as to be complementary to the inner wall portion 39 of the body portion 38 and is thereby of such a configuration to lie precisely against the annular inner wall portion 14 of the core 11.

Figure 4:
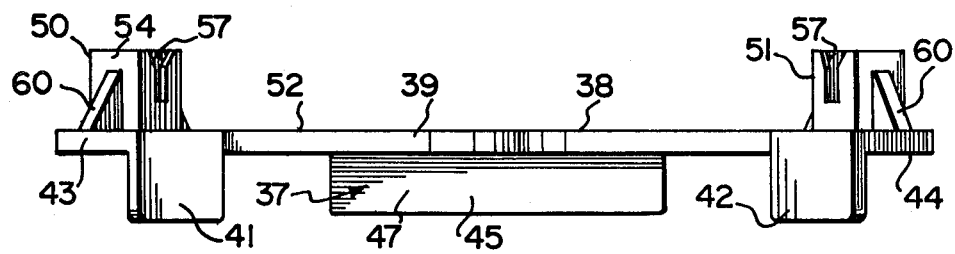
FIG. 4 is a side elevational view of the terminal connector of FIG. 3.
Figure 5:
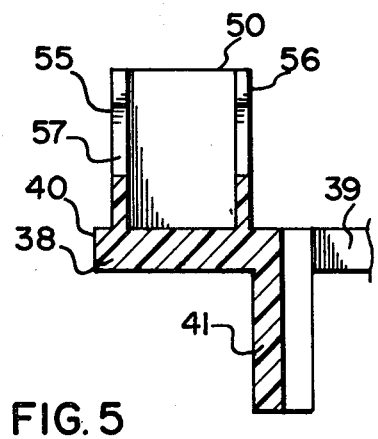
FIG. 5 is a sectional view taken on the line 5—5 of FIG. 3 and showing one of the connector wells of the terminal connector of FIG. 3.
Figure 6:
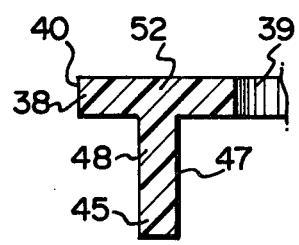
FIG. 6 is a sectional view taken on the line 6—6 of FIG. 3.

In order that the terminal connector 37 may be clampingly and frictionally engaged with the upper laminations of the stator core 11, an exterior depending leg or flange 45 is integrally formed on, and extends downwardly from, the lower surface 46 of the body portion 38. As shown particularly in FIGS. 3 and 4, the exterior flange 45 is rectangular and includes elongated generally parallel vertical side walls 47 and 48. The inner side wall 47 is adapted to engage the generally planar wall portions 13 of the assembled core 11, as shown in FIG. 1.

From the foregoing, it will be understood that the exterior flange 45 will engage the exterior flat wall portion 13 of the stator core, thereby insuring proper positioning of the terminal connector 37 behind the adjacent stator pole 23 or 24. Further, the exterior flange 45 will cooperate with the interior lug members 41 and 42, which engage and are flush with the arcuate inner surface or walls 14 of the laminate stack forming the core, to frictionally and clampingly retain the terminal connector strip 37 to the core assembly.

In order to provide a means for securing the terminal ends 35 and 36 of the coil winding 32 so that the ends 35 and 36 may be selectively electrically connected to the terminals of an associated electrical component (not shown), electrical connecting wells 50 and 51 are integrally formed or connected adjacent the ends 43 and 44 of the body portion 38 of the terminal connector 37. The connecting wells extend upwardly from the upper surface 52 of the body portion 38 of the terminal connector 37. Each well has a generally rectangular cross section, having side walls 53 and 54 and interior and exterior walls 55 and 56, respectively. An elongated notch 57 is provided in both the interior and exterior wall portions 55 and 56 for securing and retaining the terminal ends 35 and 36 of the field coil winding 32 after the field coil has been wound about the adjacent stator pole as shown in FIG. 2. In order to strengthen the connector wells, integral reinforcing flange members 60 are provided connecting the side walls 53 and 54 with the upper surface 52 of the terminal connector 37.

The simple shape of the terminal connector 37 of the invention makes it suitable for automated processes in which the stator assembly is put together largely automatically. In such processes, the complexity of the assembly equipment required generally increases with the complexity of the shapes of the components to be handled. Terminal connectors according to the invention can simply be fed into a hopper, with a gravity feed to orient each connector properly for insertion into the stator core. A rotating disc provided with means for gripping the periphery of the stator core can be used to transport the core to the position where the terminal connector is mounted, and then rotated further to replace the stator core in the stream of movement along the assembly line for conveyance to the next work station.

In construction, the insulated terminal connector of the present invention is preferably integrally molded from a non-conductive plastic material. Each terminal connector or connecting strip is generally of a sufficient size to extend or overlie approximately one-third of the annular upper surface of the core, i.e., the body of the terminal connector extends around approximately 120° of a circle. After the ferrous annular laminations forming the stator core have been stacked, the insulated terminal connector 37 is frictionally forced downward until the body portion 38 rests against the upper surface or face of the core adjacent one of the stator poles. In this position, the exterior flange 45 engages an exterior flat planar wall portion 28 or 29 of the stator core 11 while the offset interior lug portions 41 and 42 engage respective spaced arcuate inner wall portions of the laminated core, so that the upper laminates of the core are clampingly engaged between the inner lug members and the exterior flange 45.

Because the exterior flange 45 is both angularly displaced relative to the inner lugs 41 and 42 and is engaged with the outer planar surface 28 or 29 of the core while the lugs 41, 42 engage the arcuate or annular inner walls of the core, the terminal connector 37 cannot be shifted either radially or circumferentially along the upper surface of the core. The generally planar exterior flange 45 tends to limit any movement of the terminal connector 37 to a direction parallel to the planar core surface 28 or 29; however, the arcuate lugs 41 and 42 tend to direct movement circumferentially. Thus, if force is applied to shift the terminal connector 37, either the exterior flange 45 or the inner lugs 41, 42 will bind against the core 11 and prevent accidental displacement.

With particular reference to FIGS. 1 and 2, it should be noted that when the insulated terminal strip 37 is in the mounted position, the inner and outer arcuate walls thereof are substantially co-extensive with the annular inner and outer walls of the laminations 10. Also, although a single exterior flange 45 has been described, two or more spaced apart, exterior depending flange members could be provided to engage the flat exterior wall of the core to provide the same stabilizing and clamping effect in cooperation with the interior tabs or lug members 41, 42.

After a terminal connector strip 37 is mounted on the core behind each of the stator poles 23 and 24, the field coil is wound in the winding grooves of the stator poles, and the free ends 35 and 36 of each winding are extended over the notches 57 formed in the spaced terminal wells 50 and 51 adjacent each end of the body portion 38 of the terminal strip 37. The terminal ends 35 and 36 are subsequently forced down into the notches 57 and are retained therein frictionally. The terminals of the associated electrical motor components, such as the leads to the commutator brushes, can now be inserted into the wells and thereby electrically connected to the stator windings. The motor is then ready for assembly. Due to the positioning of the terminal connector of the present invention, behind the poles and with no connection between the terminal connector 37 and other components of the motor other than as herein described, assembly and disassembly of the motor can be accomplished without interfering with the terminal connector.

Figure 7:
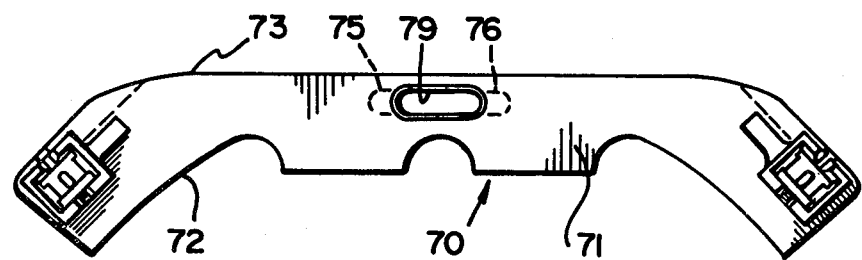
FIG. 7 is a top plan view of a second preferred embodiment of the terminal connector of the invention.
Figure 8:
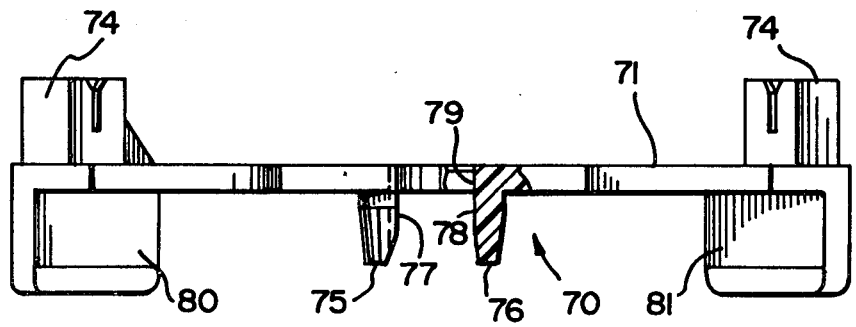
FIG. 8 is a side elevational view of the terminal connector of FIG. 7.

FIGS. 7 and 8 show a second preferred embodiment 70 of the invention. The second preferred embodiment, like the first, comprises a generally arcuate, flat body portion 71 whose inner and outer contours 72 and 73, respectively are shaped to overlie those of the stator laminate stack (excepting the poles). A terminal connector well 74 is provided near each end of the body portion 71. The wells 74 are identical to those of the embodiment of FIGS. 1–6 and therefore will not be further described.

The connector 70 of FIGS. 7 and 8 is retained in place on the core by means of two retention posts 75, 76, which are preferably approximately semicircular in cross section, with their flat surfaces 77, 78 facing each other. (Alternatively, the posts may have a generally rectangular cross section.) In either case, the posts 75, 76 preferably taper slightly. The posts 75, 76 extend downward from the lower face of the body portion 71 of the terminal connector 70, and preferably are directed slightly away from each other. Both posts 75, 76 are received in a slot (not shown) provided in the stator core for that purpose immediately behind (i.e. radially outward from) the pole. The slot in the core is preferably of such dimensions as to deflect the posts 75, 76 toward each other slightly. The resulting force between the posts 75, 76 and the laminations constituting the stack insures sufficient friction to retain the terminal connector 70 firmly in position.

The two posts 75, 76 are preferably disposed at either end of a short through-slot 79 provided in the terminal connector body 71 to receive an insulated metal strip (not shown) that passes through the length of the core via the slot formed therein for the posts 75, 76 and is used to support the coil away from the end face of the core in a known manner.

To stabilize the terminal connector 70 in place on the core, two lugs or tabs 80, 81 are provided. These are preferably provided near the ends of the terminal connector 70, although they could be located elsewhere. In the preferred embodiment shown, the lugs 80, 81 are provided at the exterior contour 73 of the connector 70, so as to lie flat against the arcuate portions 12 of the exterior wall of the stator core 11 (see FIG. 1). Thus, the lugs 80, 81 tend to prevent any inward tipping of the terminal connector 70. This purpose could be achieved, however, by placing the lugs on the interior side of the terminal connector 70 as is the case with the lugs 41, 42 of the embodiment of FIGS. 1–6.

The special advantage of the terminal connector of the invention lies in the ease with which it can be applied to a stator core using relatively simple, but high-speed, automated assembly line equipment. For example, the connector pieces of the invention can be deposited in a vibrating hopper, which feeds them one at a time, purely by means of gravity, to a position where they can each be inserted in a stator core. Because of the simple shape of the terminal connectors, the gravity feed can be relied upon to position and orient each connector correctly for insertion, without additional equipment. At the same time, the connector piece is retained firmly in position on the stator core. In the case of the embodiment of FIGS. 1-6, this is achieved by means of the three-point grip effected by the two inner lugs 41, 42 and the outer flange 45, which, despite their simple shape, effectively grip the core 11. In the case of the embodiment of FIGS. 7 and 8, the two retention posts 75, 76 are sufficient to retain the terminal connector 70 in position, the lugs 80, 81 serving only to provide additional stability of alignment.

In automatic assembly of the stator unit, it may be convenient to move the stator stack by means of a device gripping a portion of the perimeter of the lateral exterior surface of the stack. It has been determined that in the course of such handling, the external flange 45 of the connector 37 of the embodiment of FIGS. 1-6 will sometimes collide with part of the assembly machinery and tip the terminal connector 37 inward toward the center of the stator core on which it has been mounted. This problem is altogether avoided by the use of the embodiment of FIGS. 7 and 8, in which the connector 70 is firmly retained in place by the posts 75, 76 alone, and the lugs 80, 81 serve only as extra insurance against inward tipping of the connector 70.

The simplicity of the shape of both embodiments of the terminal connector of the invention has an additional advantage with respect to automatic assembly of the stator unit. The terminal connector of the invention is contemplated to be injection molded from plastic, as terminal connectors commonly are. It is well known that injection-molded plastic articles cannot be manufactured with the same strict tolerances that can commonly be achieved, and are always required, in the manufacture of stator core laminations and other electrical motor parts. There is a certain probability that a given terminal connector will be either slightly too large or slightly too small for the stator core. If the connector is too large, it will not be retained as securely as is desirable, while if the connector is too small, it will suffer constant stress while in place and, due to the resulting material fatigue, is likely eventually to break. It is therefore desirable to make the shape of the terminal connector as simple as possible and to minimize the number of dimensions and tolerances of the connector that are critical in determining a correct fit between the connector and the stator core. By doing so, the likelihood of a misfit between the terminal connector and the stator core is reduced. The simple shape of the connector of the invention achieves this desirable result.

Although the present invention has been particularly described with reference to two preferred embodiments thereof, many modifications and variations thereof will now be apparent to those skilled in the art. Accordingly, the scope of the invention is to be limited not by the details described herein but only by the terms of the appended claims.

I claim:

1. A terminal connector for use with a stator core of an electrical motor, the stator core having inner arcuate wall portions, and an outer wall having flat portions, a pole portion extending inwardly from the inner arcuate walls thereof and a field coil wound about the pole portion and having terminal ends, said terminal connector comprising: an elongated generally flat body portion having inner and outer arcuate walls and spaced ends; at least two depending lug means extending fixedly in one direction from said inner arcuate walls in spaced relationship with each other and being arcuately shaped so as to be complementary to the inner arcuate wall portions of the core on the opposite sides of the pole portion; exterior flange means including an elongated generally planar wall portion which is angularly disposed relative to said body portion and spaced from said inner wall of said body portion and depending fixedly in said one direction so as to meet said outer arcuate wall of said body portion at two points, said exterior flange means being disposed generally between said depending lug means adjacent said outer arcuate wall of said body portion in a position to engage the flat portion of the outer wall of the stator core, said depending lug means and said exterior flange means being for cooperating with each other and with the stator core to frictionally and securely retain said terminal connector on the stator core adjacent to the pole portion of the stator core, and in a predetermined alignment relative to the stator core; and terminal well means disposed on said body portion adjacent each said end of said body portion, said terminal well means including means for receiving the terminals of the field coil.

2. The terminal connector of claim 1 in which said body portion of said terminal connector defines an arc of not greater than approximately 120°.

3. In combination, the terminal connector of claim 1 and a stator core for an electrical motor, said stator core comprising: a field core having inner arcuate wall portions, an outer wall and an end face portion, said outer wall having spaced arcuate portions and generally planar portions, said arcuate portions being connected by said generally planar portions, stator pole means disposed inwardly of said inner walls, winding groove means provided between said pole means and said inner wall portions of said field core, and stator coil means wound within said winding groove means and said terminal connector being mounted adjacent said stator pole means on said end face portion of said field core, said depending lug means and said exterior flange means cooperating with each other and with said field core to frictionally retain said body portion securely on said field core adjacent to said pole means of said field core and with a predetermined alignment relative to said field core.

4. A terminal connector for use with a stator core of an electrical motor, the stator core having inner and outer arcuate wall portions, a pole portion extending inwardly from said inner arcuate wall portions, an end face perpendicular to said wall portions having an aperture adjacent said pole portion, and a field coil wound about said pole portion and having terminal ends, said terminal connector comprising: an elongated generally flat body portion having inner and outer arcuate edges and spaced ends; at least two depending lug means extending fixedly in one direction from said outer arcuate edges in spaced relationship with each other and being arcuately shaped so as to be complementary to said outer arcuate wall portions of said core on the opposite sides of said pole portion; two retention posts extending from said body portion and spaced from said inner arcuate edge of said body portion and from said outer arcuate edge of said body portion and depending fixedly in said one direction toward said end face, said retention posts being disposed generally between said depending lug means in a position to engage said aperture in said end face, said retention posts extending slightly away from each other and being resilient, and pressing resiliently against the sides of said aperture to frictionally and securely retain said terminal connector on said end face adjacent to said pole portion, said depending lug means cooperating with said retention posts and said stator core to maintain said terminal connector in a predetermined alignment relative to said stator core; and terminal well means disposed on said body portion adjacent each said end of said body portion, said terminal well means including means for receiving the terminals of said field coil.

5. The terminal connector of claim 1 in which said body portion of said terminal connector defines an arc of not greater than approximately 120°.

6. In combination, the terminal connector of claim 1 and a stator core for an electrical motor, said stator core comprising: a field core having inner and outer arcuate wall portions, stator pole means disposed inwardly of said inner arcuate wall portions, an end face portion perpendicular to said wall portions and having an aperture adjacent said stator pole means, winding groove means provided between said pole means and said inner arcuate wall portions, and stator coil means wound within said winding groove means, said terminal connector being mounted adjacent said stator pole means on said end face portion of said field core, said retention posts extending slightly away from each other and being resilient and pressing resiliently against the sides of said aperture to frictionally retain said body portion securely on said field core adjacent to said pole means of said field core, and said depending lug means cooperating with said retention posts and said field core to maintain said terminal connector in a predetermined alignment relative to said field core.

* * * * *

UNITED STATES PATENT AND TRADEMARK OFFICE
CERTIFICATE OF CORRECTION

PATENT NO. : 4,481,435

DATED : November 6, 1984

INVENTOR(S) : Leonard T. Loforese

It is certified that error appears in the above-identified patent and that said Letters Patent is hereby corrected as shown below:

Claim 5, line 1, "1" should be --4--.

Claim 6, line 1, "1" should be --4--.

Signed and Sealed this

Seventeenth Day of September 1985

[SEAL]

Attest:

DONALD J. QUIGG

Attesting Officer

Commissioner of Patents and Trademarks—Designate